(12) United States Patent
Molholm

(10) Patent No.: US 11,792,531 B2
(45) Date of Patent: Oct. 17, 2023

(54) GAZE-BASED EXPOSURE

(71) Applicant: Apple Inc., Cupertino, CA (US)

(72) Inventor: Robert K Molholm, Novato, CA (US)

(73) Assignee: Apple Inc., Cupertino, CA (US)

(*) Notice: Subject to any disclaimer, the term of this patent is extended or adjusted under 35 U.S.C. 154(b) by 145 days.

(21) Appl. No.: 17/001,484

(22) Filed: Aug. 24, 2020

(65) Prior Publication Data

US 2021/0099632 A1  Apr. 1, 2021

Related U.S. Application Data

(60) Provisional application No. 62/907,417, filed on Sep. 27, 2019.

(51) Int. Cl.
| | |
|---|---|
| *H04N 23/741* | (2023.01) |
| *G06T 15/50* | (2011.01) |
| *G06F 3/01* | (2006.01) |
| *H04N 23/73* | (2023.01) |
| *H04N 23/611* | (2023.01) |

(52) U.S. Cl.
CPC ........... *H04N 23/741* (2023.01); *G06F 3/013* (2013.01); *G06T 15/503* (2013.01); *H04N 23/611* (2023.01); *H04N 23/73* (2023.01)

(58) Field of Classification Search
CPC ............. H04N 5/2355; H04N 5/23219; H04N 5/2353; H04N 5/2256; H04N 5/33; H04N 23/741; H04N 23/611; H04N 23/73; H04N 23/56; G06F 3/013; G06F 3/011; G06T 15/503; G06T 19/006; G06T 15/506
See application file for complete search history.

(56) References Cited

U.S. PATENT DOCUMENTS

| | | |
|---|---|---|
| 8,326,084 B1 | 12/2012 | Marrion, Jr. et al. |
| 10,666,856 B1 | 5/2020 | Rueckner |
| 10,720,128 B2 | 7/2020 | Young et al. |
| 11,287,884 B2 | 3/2022 | Young et al. |
| 2007/0189758 A1* | 8/2007 | Iwasaki ............... G03B 7/08 396/234 |
| 2009/0190832 A1 | 7/2009 | Myakosh et al. |

(Continued)

FOREIGN PATENT DOCUMENTS

| | | |
|---|---|---|
| CN | 101494725 | 7/2009 |
| CN | 102883055 | 1/2013 |

(Continued)

OTHER PUBLICATIONS

Office action and Search Report from Chinese Application No. 202010996006.4, dated May 1, 2022, (English translation and Chinese version), pp. 1-23.

(Continued)

*Primary Examiner* — Jason A Flohre
(74) *Attorney, Agent, or Firm* — Robert C. Kowert; Kowert, Hood, Munyon, Rankin & Goetzel, P.C.

(57) ABSTRACT

A processing pipeline and method for mixed reality systems that utilizes selective auto-exposure for a region of interest in a scene based on gaze and that compensates exposure for the rest of the scene based on ambient lighting information for the scene. Images may be generated for display that provide an exposure-compensated, foveated high dynamic range (HDR) experience for the user.

20 Claims, 7 Drawing Sheets

(56) References Cited

U.S. PATENT DOCUMENTS

| | | | | |
|---|---|---|---|---|
| 2010/0020341 A1* | 1/2010 | Enjuji | ............... | G06T 5/40 |
| | | | | 358/1.9 |
| 2010/0208105 A1* | 8/2010 | Kubota | ............ | H04N 5/772 |
| | | | | 348/E5.073 |
| 2013/0258089 A1* | 10/2013 | Lyons | ............ | H04N 5/23218 |
| | | | | 348/77 |
| 2014/0341468 A1* | 11/2014 | Paris | ............ | H04N 19/30 |
| | | | | 382/167 |
| 2015/0003819 A1* | 1/2015 | Ackerman | ........ | H04N 5/23212 |
| | | | | 396/51 |
| 2015/0193658 A1 | 7/2015 | Miller et al. | | |
| 2015/0325008 A1 | 11/2015 | Scarff | | |
| 2018/0007258 A1* | 1/2018 | Seko | ............ | H04N 5/23212 |
| 2019/0188837 A1* | 6/2019 | Li | ............ | G06T 5/009 |
| 2021/0051260 A1* | 2/2021 | Lee | ............ | G06F 3/013 |

FOREIGN PATENT DOCUMENTS

| | | |
|---|---|---|
| CN | 105900415 | 8/2016 |
| CN | 106791471 | 5/2017 |
| CN | 106791475 | 5/2017 |
| CN | 107172364 | 9/2017 |
| WO | 2017181429 | 10/2017 |

OTHER PUBLICATIONS

Office action and Search Report from Chinese Application No. 202010996006.4, dated Dec. 19, 2022, (English translation and Chinese version), pp. 1-16.

\* cited by examiner

GAZE-BASED EXPOSURE

PRIORITY INFORMATION

This application claims benefit of priority of U.S. Provisional Application Ser. No. 62/907,417 entitled "GAZE-BASED EXPOSURE" filed Sep. 27, 2019, the content of which is incorporated by reference herein in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

An eye tracker is a device for estimating eye positions and eye movement. Eye tracking systems have been used in research on the visual system, in psychology, psycholinguistics, marketing, and as input devices for human-computer interaction. In the latter application, typically the intersection of a person's point of gaze with a desktop monitor is considered.

SUMMARY

Various embodiments of methods and apparatus for gaze-based exposure in mixed or augmented reality (MR) applications are described. Embodiments of a processing pipeline and method for MR systems that utilizes selective auto-exposure for a region of interest in a scene based on gaze and that compensates exposure for the rest of the scene based on ambient lighting information for the scene are described. Embodiments may generate images for display to the user that provide an exposure-compensated, foveated high dynamic range (HDR) experience.

In embodiments, auto-exposure of the HMD scene camera system is enabled, but does not produce an image to the end user that appears to be auto-exposed. The exposure is moved to a ground truth exposure (the scene), but all detail remains in the image—detail that may have been lost if handled in a device-referred manner, limiting encoding to a 0-1.0 range. This additional headroom is preserved through the pipeline, and is revealed via highlight compression in the tone mapping applied at the output end. The images out of the camera are auto-exposed based on the user's gaze—generating a darker image when the user looks at a bright object (e.g. at a desk lamp), and getting brighter when the user looks at a dark area (e.g. under a table that the lamp is sitting on). The camera exposure window is smaller than that of the scene, and moves around within the scene's range.

The camera image is compensated to scale its RGB values based on the scene exposure. This leverages a HDR photography technique of merging multiple exposures though exposure stacking, except that only one exposure, optimal to the user's gaze direction, is captured (as opposed to multiple exposures in HDR photograph). Due to foveation, the end user is not aware of the artifacts in the periphery, where exposure may not be optimal, and image quality may be lower.

Figure 1:
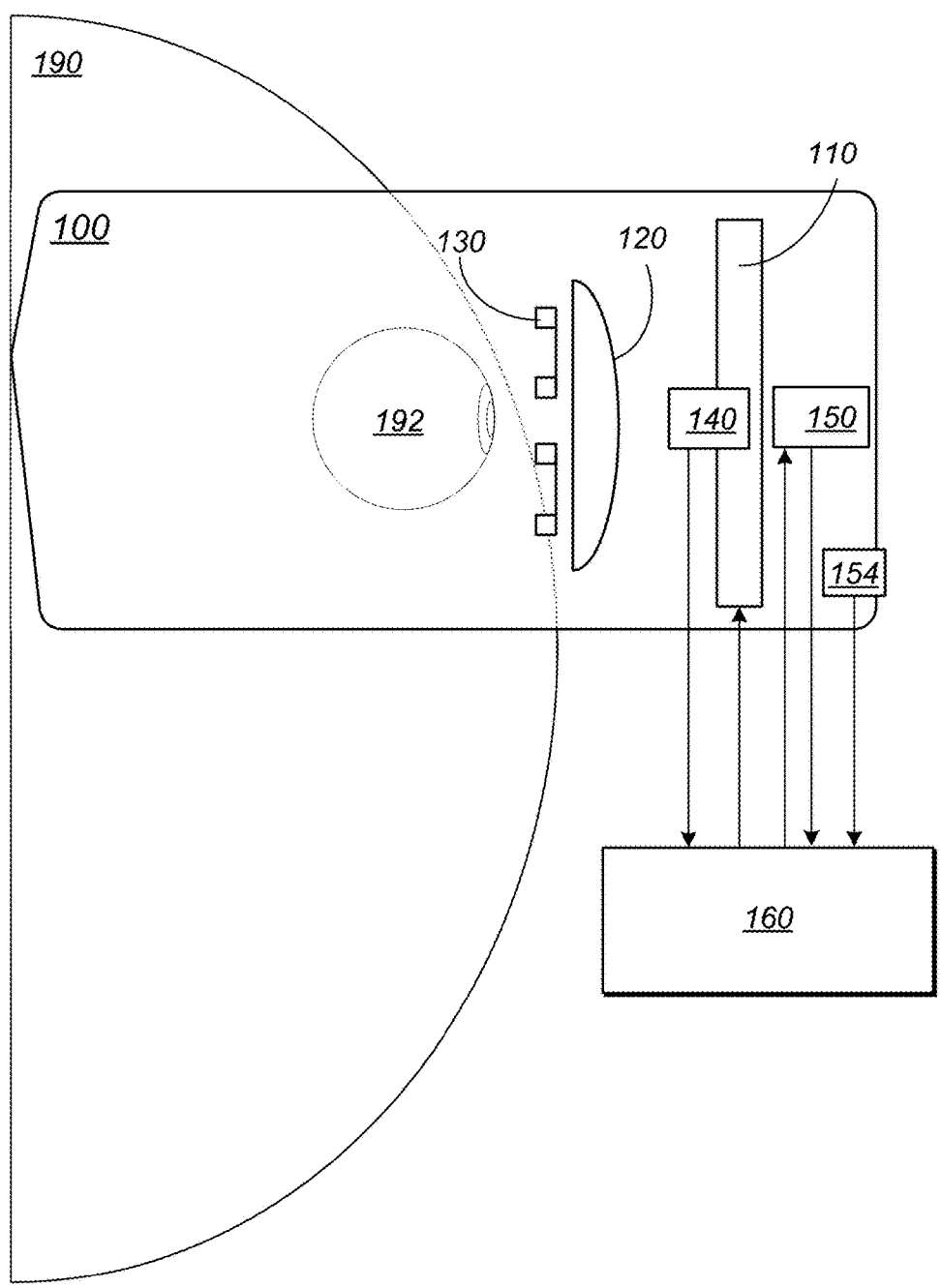
FIG. 1 illustrates an example head-mounted device (HMD) in a mixed or augmented reality (MR) system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.).

For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for gaze-based exposure in mixed or augmented reality (MR) applications are described. A video pass-through MR system may include a device such as a headset, helmet, goggles, or glasses (referred to herein as a head-mounted device (HMD)) that includes a display (e.g., left and right displays) for displaying frames including left and right images in front of a user's eyes to thus provide three-dimensional (3D) virtual views to the user. The MR system may also include a controller. The controller may be implemented in the HMD, or alternatively may be implemented at least in part by an external device (e.g., a computing system) that is communicatively coupled to the HMD via a wired or wireless interface. The controller may include one or more of various types of processors, image signal processors (ISPs), graphics processing units (GPUs), coder/decoders (codecs), and/or other components for processing and rendering video and/or images. The controller may render frames (each frame including a left and right image) that may include virtual content based at least in part on inputs obtained from visible light video cameras (referred to as scene cameras) and other sensors (e.g., depth sensors) on the HMD, and may provide the frames to a display system of the HMD for display. The MR system may also include an eye tracking system (which may also be referred to as a gaze tracking system). Images captured by the eye tracking system may be analyzed by the controller to detect features (e.g., pupil), position, and movement of the user's eyes, and/or to detect other information about the eyes such as pupil dilation. A point of gaze on the display may be estimated from the eye tracking images.

Embodiments of a processing pipeline and method for MR systems that utilizes selective auto-exposure for a region of interest in a scene based on gaze and that compensates exposure for the rest of the scene based on ambient lighting information for the scene are described. Embodiments may generate images for display to the user that provide an exposure-compensated, foveated high dynamic range (HDR) experience.

In embodiments, auto-exposure of the HMD scene camera system is enabled, but does not produce an image to the end user that appears to be auto-exposed. The exposure is moved to a ground truth exposure (the scene), but all detail remains in the image—detail that may have been lost if handled in a device-referred manner, limiting encoding to a 0-1.0 range. This additional headroom is preserved through the pipeline, and is revealed via highlight compression in the tone mapping applied at the output end. The images out of the camera are auto-exposed based on the user's gaze—generating a darker image when the user looks at a bright object (e.g. at a desk lamp), and getting brighter when the user looks at a dark area (e.g. under a table that the lamp is sitting on). The camera exposure window is smaller than that of the scene, and moves around within the scene's range. The camera image is compensated to scale its RGB values based on the scene exposure. This leverages a HDR photography technique of merging multiple exposures though exposure stacking, except that only one exposure, optimal to the user's gaze direction, is captured (as opposed to multiple exposures in HDR photograph). Due to foveation, the end user is not aware of the artifacts in the periphery, where exposure may not be optimal, and image quality may be lower.

Embodiments of methods and apparatus to provide gazed-based exposure in MR systems are broadly described below. Further details on the methods and apparatus are described in reference to FIGS. 1 through 5.

Embodiments may, for example, be implemented in MR systems that include a head mounted display (HMD) equipped with scene cameras for video pass-through, an eye or gaze tracking system, and a method for ambient light detection such as one or more ambient light sensors.

Image statistics are gathered from a small region of interest (spot metering). The position of the ROI (Region of Interest) on the full image from the camera is based on the user's gaze direction as determined by the eye tracking system.

A camera image is auto-exposed based on the metered result through a combination of integration time and gain in order to acquire a properly exposed image (with the least amount of noise) within the ROI.

Absolute scene exposure is measured by one or more ambient light sensors.

Exposure compensation is applied to the image from the camera to scale it to the proper scene exposure (ExpComp=EVscene−EVcamera). The exposure compensation is performed with adequate precision to be lossless to the image. Some camera RGB values may end up exceeding 1.0—this is HDR headroom.

An optional compositing step may then be added where virtual content (e.g., rendered assets or externally acquired images) sharing the same scene exposure are blended, for example using an additive alpha blend (Aa+B(1−a)).

Finally, the image is tone mapped from its HDR linear encoding down to the dynamic range of the gaze-tracking display device. The tone mapping algorithm may include a form of highlight compression in order to reveal any highlight detail produced by either the camera or the render, up to the limitations of precision and the dynamic range of the display.

While embodiments are generally described with respect to video pass-through mixed or augmented reality (MR) systems, embodiments of the methods and apparatus described herein may also be applied in virtual reality (VR) applications.

Physical Environment

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed Reality

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented Reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented Virtuality

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 shows an example video pass-through head-mounted device (HMD) in a mixed or augmented reality (MR) system, according to some embodiments. Note that HMD 100 as illustrated in FIG. 1 is given by way of example, and is not intended to be limiting. In various embodiments, the shape, size, and other features of an HMD 100 may differ, and the locations, numbers, types, and other features of the components of an HMD 100 may vary. HMD 100 may include, but is not limited to, a display 110 and two optical lenses (eyepieces) 120, mounted in a wearable housing or frame. As shown in FIG. 1, HMD 100 may be positioned on the user 190's head such that the display 110 and eyepieces 120 are disposed in front of the user's eyes 192. The user looks through the eyepieces 120 onto the display 110. HMD 100 may also include sensors that collect information about the user's environment (video, depth information, lighting information, etc.) and about the user (e.g., eye or gaze tracking sensors). The sensors may include, but are not limited to one or more eye tracking cameras 140 (e.g., infrared (IR) cameras) that capture views of the user's eyes 192, one or more scene (visible light) cameras 150 (e.g., RGB video cameras) that capture images of the real world environment in a field of view in front of the user, and one or more ambient light sensors 154 that capture lighting information for the environment.

Figure 5:
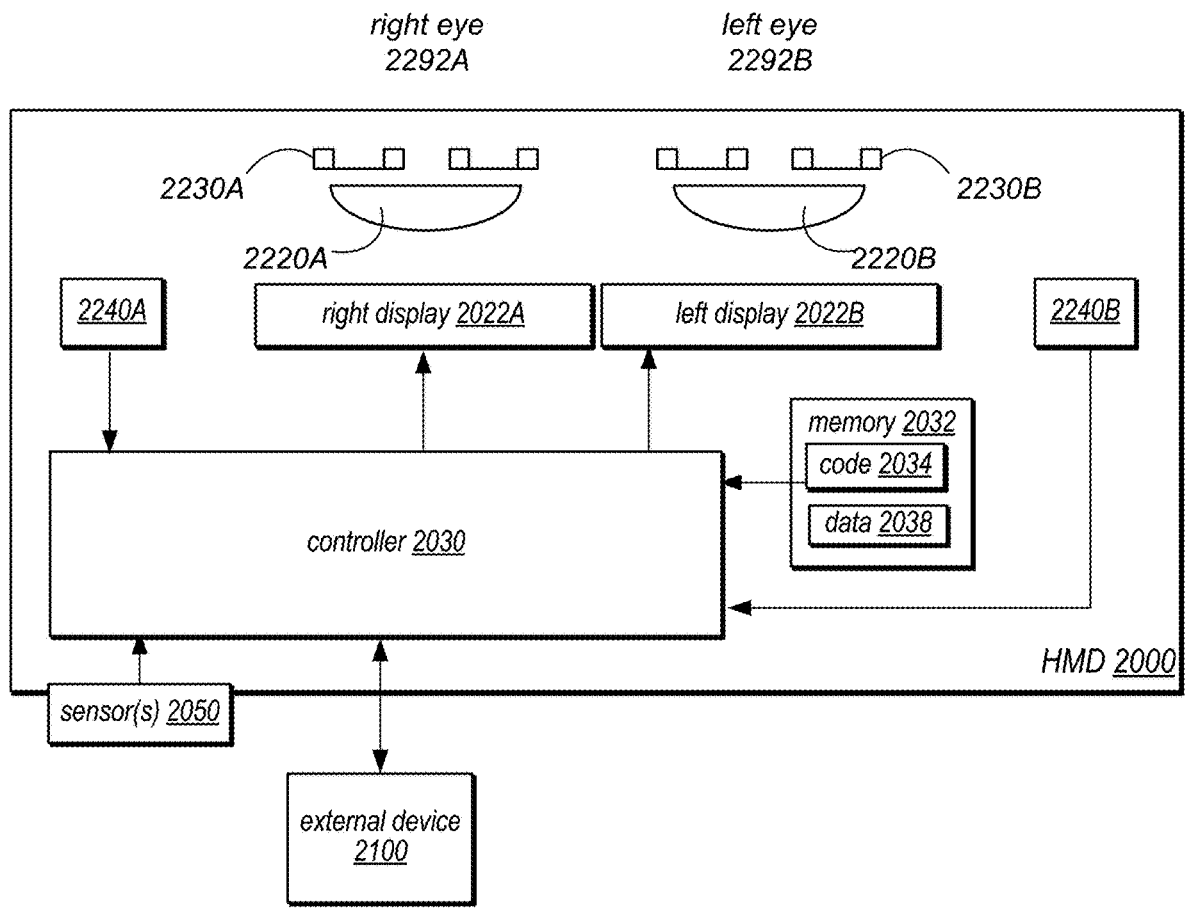
FIG. 5 is a block diagram illustrating an example MR system that may include components and implement methods as illustrated in FIGS. 1 through 4E, according to some embodiments.

A controller 160 for the MR system may be implemented in the HMD 100, or alternatively may be implemented at least in part by an external device (e.g., a computing system) that is communicatively coupled to HMD 100 via a wired or wireless interface. Controller 160 may include one or more of various types of processors, image signal processors (ISPs), graphics processing units (GPUs), coder/decoders (codecs), and/or other components for processing and rendering video and/or images. Controller 160 may render frames (each frame including a left and right image) that include virtual content based at least in part on inputs obtained from the sensors 140, 150, and 154, and may provide the frames to display 110. FIG. 5 further illustrates components of an HMD and MR system, according to some embodiments.

In some embodiments, an eye tracking system for the MR system may include, but is not limited to, one or more eye tracking cameras 140 and an IR light source 130. IR light source 130 (e.g., IR LEDs) may be positioned in the HMD 100 (e.g., around the eyepieces 120, or elsewhere in the HMD 100) to illuminate the user's eyes 192 with IR light. At least one eye tracking camera 140 (e.g., an IR camera, for example a 400×400 pixel count camera or a 600×600 pixel count camera, that operates at 850 nm or 940 nm, or at some other IR wavelength, and that captures frames at a rate of 60-120 frames per second (FPS)) is located at each side of the user 190's face. In various embodiments, the eye tracking cameras 140 may be positioned in the HMD 100 on each side of the user 190's face to provide a direct view of the eyes 192, a view of the eyes 192 through the eyepieces 120, or a view of the eyes 192 via reflection off hot mirrors or other reflective components. Note that the location and angle of eye tracking camera 140 is given by way of example, and is not intended to be limiting. While FIG. 1 shows a single eye tracking camera 140 located on each side of the user 190's face, in some embodiments there may be two or more eye tracking cameras 140 on each side of the user 190's face.

A portion of IR light emitted by light source(s) 130 reflects off the user 190's eyes and is captured by the eye tracking cameras 140 to image the user's eyes 192. Images captured by the eye tracking cameras 140 may be analyzed by controller 160 to detect features (e.g., pupil), position, and movement of the user's eyes 192, and/or to detect other information about the eyes 192 such as pupil dilation. For example, the point of gaze on the display 110 may be estimated from the eye tracking; the estimated point of gaze may be used to cause the scene camera(s) 150 of the HMD 100 to expose images of a scene based on a region of interest (ROI) corresponding to the point of gaze As described herein with reference to FIGS. 2 through 4E, the information collected by the eye tracking system may then be used by controller 160 in combination with information collected by the ambient light sensor(s) 154 to generate exposure-compensated, foveated images for display. As another example, the estimated point of gaze may enable gaze-based interaction with content shown on the display 110. As another example, in some embodiments, brightness of the displayed images may be modulated based on the user's pupil dilation as determined by the eye tracking system.

Embodiments of an HMD 100 as illustrated in FIG. 1 may, for example, be used in augmented or mixed (AR) applications to provide augmented or mixed reality views to the user 190. HMD 100 may include one or more sensors, for example located on external surfaces of the HMD 100, that collect information about the user 190's external environment (video, depth information, lighting information, etc.); the sensors may provide the collected information to controller 160 of the MR system. The sensors may include one or more visible light cameras 150 (e.g., RGB video cameras) that capture video of the user's environment that may be used to provide the user 190 with a virtual view of their real environment. In some embodiments, video streams of the real environment captured by the visible light cameras 150 may be processed by the controller 160 of the HMD 100 to render augmented or mixed reality frames that include virtual content overlaid on the view of the real environment, and the rendered frames may be provided to display 110. As described herein with reference to FIGS. 2 through 4E, the information collected by the eye tracking cameras 140 may be used by controller 160 in combination with information collected by the ambient light sensor(s) 154 to generate exposure-compensated, foveated images for display.

Figure 2:
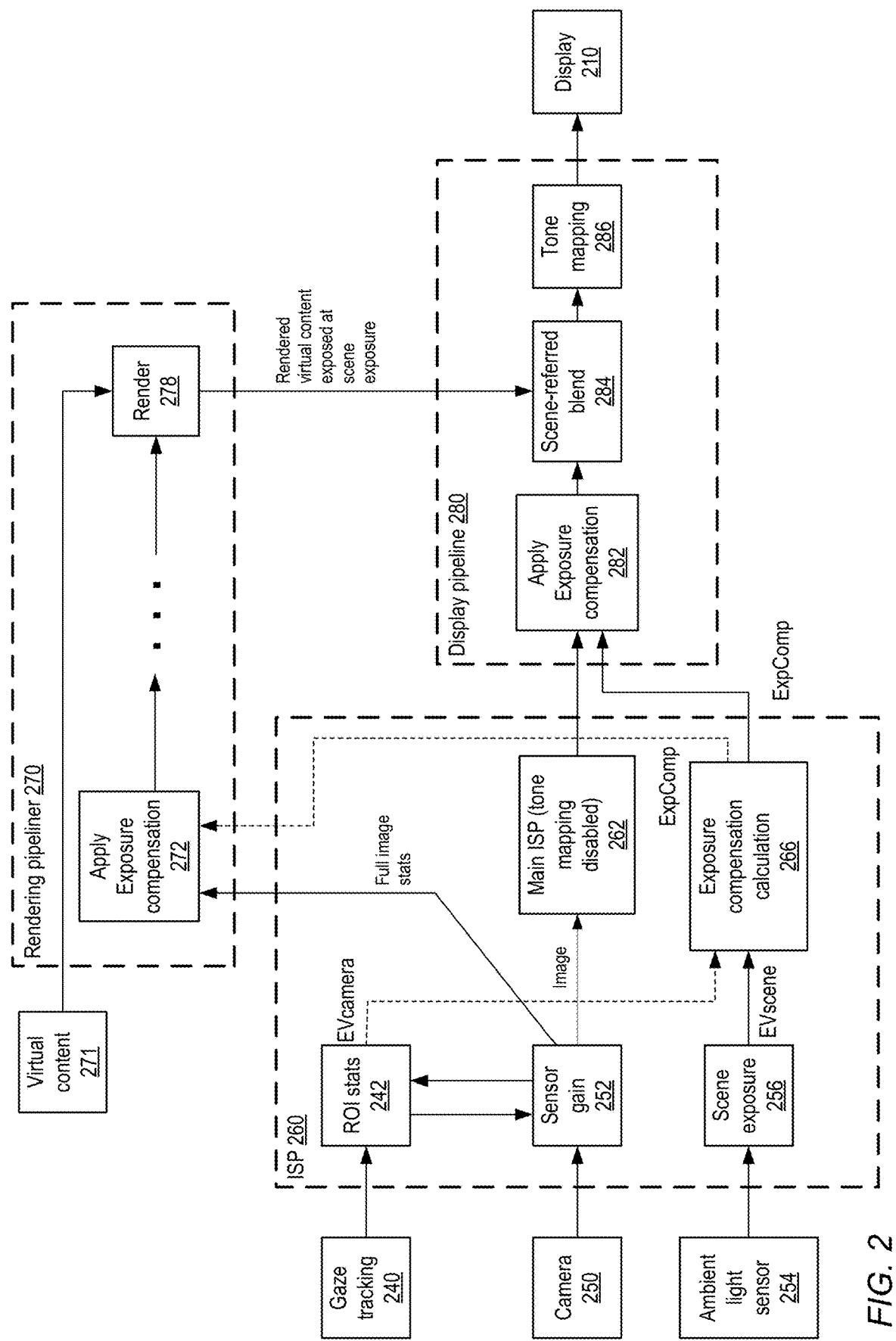
FIG. 2 illustrates an example processing pipeline for generating exposure-compensated, foveated images for display in a MR system, according to some embodiments.

FIG. 2 illustrates an example processing pipeline for a MR system, according to some embodiments. An MR system may include, but is not limited to, one or more scene cameras 250, a gaze tracking 240 system, an ambient light sensor 254, and a display 210. The MR system may include one or more processors that implement an image signal processor (ISP) 260, a rendering pipeline 270, and a display pipeline 280. Gaze tracking 240 may generate region of interest (ROI) statistics based on a determined point of gaze of the user. The ROI statistics are provided to sensor gain 252 so that an image is captured by camera 250 that is auto-exposed for a region of interest in a scene determined from the point of gaze based on a metered result through a combination of integration time and gain in order to acquire a properly exposed image (with the least amount of noise) within the ROI. Absolute scene exposure 256 is measured by ambient light sensor 254. Exposure compensation is calculated at 266 (ExpComp=EVscene−EVcamera). ExpComp is passed to the rendering pipeline 270 and the display pipeline 280.

In the display pipeline 280, exposure compensation 282 is applied to the image from the camera 250 (after ISP 262 processing without tone mapping) to scale the image to the proper scene exposure. Exposure compensation 282 is performed with adequate precision to be lossless to the image. Some camera RGB values may end up exceeding 1.0—this is HDR headroom. In the image output by exposure compensation 282, the region of interest in the scene remains as auto-exposed by the camera, while the rest of the image outside the region of interest is compensated to an exposure (referred to as scene exposure) as determined form the ambient light information.

In the rendering pipeline 270, virtual content 271 may be rendered into an image to be blended with the image captured by the camera 250 in the display pipeline 280. Exposure compensation 272 is applied so that the rendered virtual content has the same scene exposure as the exposure-compensated image in the display pipeline 280.

In the display pipeline 280, the rendered virtual content is blended 284 into the exposure-compensated image, for example using an additive alpha blend (Aa+B(1−a)).

Finally, the image is tone mapped 288 from its HDR linear encoding down to the dynamic range of the display 210. The tone mapping algorithm may include a form of highlight compression in order to reveal any highlight detail produced by either the camera 250 or the rendering pipeline 270, up to the limitations of precision and the dynamic range of the display 210.

Figure 3:
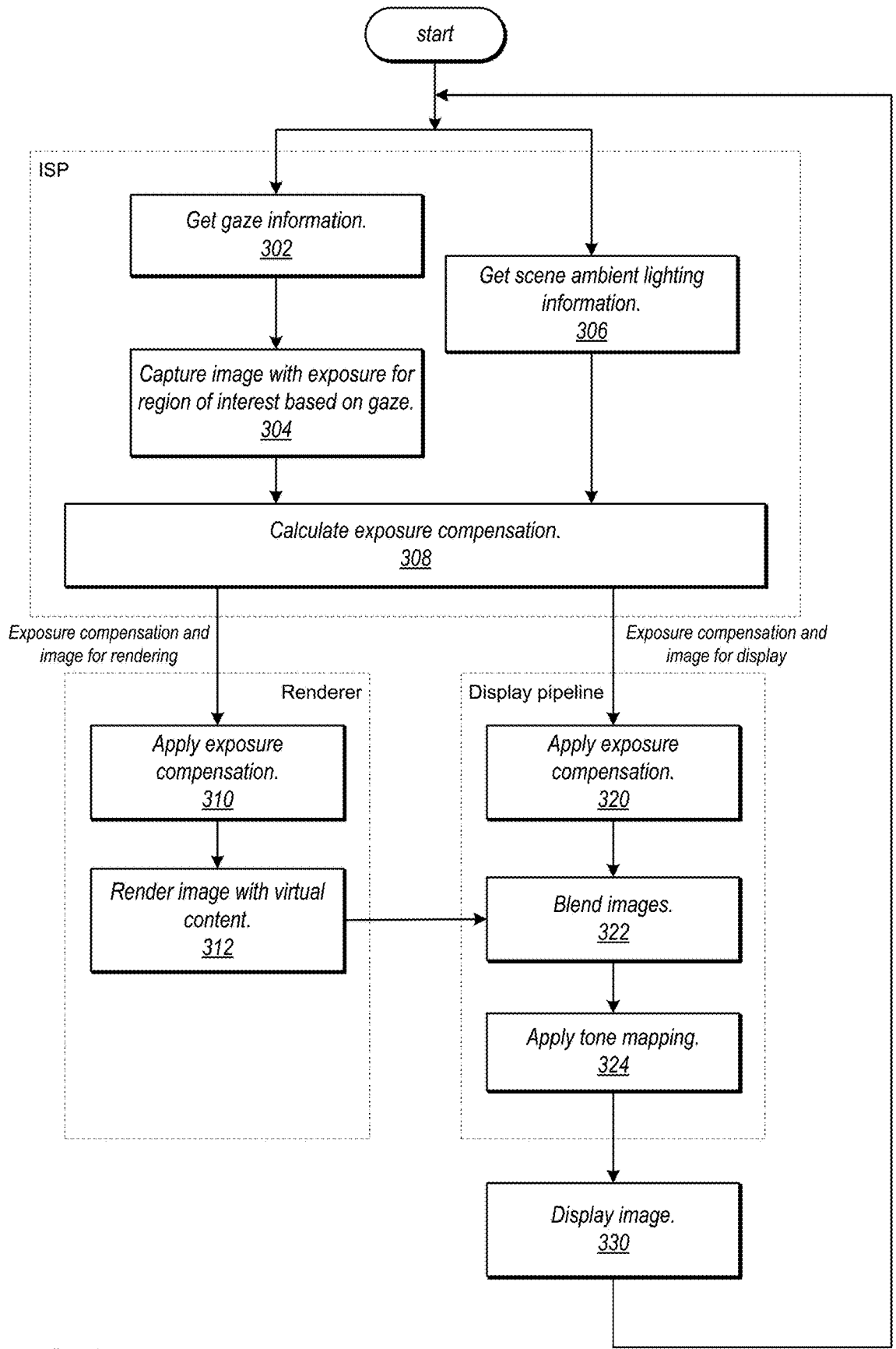
FIG. 3 is a flowchart of a method for generating exposure-compensated, foveated images for display in a MR system, according to some embodiments.

FIG. 3 is a flowchart of a method for generating exposure-compensated, foveated images for display in an MR system, according to some embodiments. Elements 302 through 308 may, for example, be performed by an ISP 260 as illustrated in FIG. 2. Elements 310 and 312 may, for example, be performed by a rendering pipeline 270 as illustrated in FIG. 2. Elements 320 through 324 may, for example, be performed by a display pipeline 280 as illustrated in FIG. 2.

As indicated at 302, gaze information is obtained, for example from a gaze tracking system. As indicated at 304, an image may be captured by a scene camera with auto-exposure set for a region of interest as determined from the gaze tracking information. In parallel with 302 and 304, ambient lighting information may be obtained for the scene captured in the image, for example by one or more ambient light sensors. As indicated at 308, exposure compensation may be calculated from the auto-exposure information of the camera and the ambient lighting information. For example:

Exposure compensation=Scene exposure−Camera exposure.

In the display pipeline, at 320, exposure compensation is performed with adequate precision to be lossless to the image. Some camera RGB values may end up exceeding 1.0—this is HDR headroom. In the image output by exposure compensation 320, the region of interest in the scene remains as auto-exposed by the camera, while the rest of the image outside the region of interest is compensated to an exposure (referred to as scene exposure) as determined form the ambient light information In the rendering pipeline, virtual content may be rendered into an image to be blended with the image captured by the camera. As indicated at 310, exposure compensation is applied so that the rendered virtual content has the same scene exposure as the exposure-compensated image in the display pipeline. As indicated at 312, an image is rendered that includes the virtual content to be blended into the camera image.

As indicated at 322 in the display pipeline, the rendered virtual content is blended into the exposure-compensated image, for example using an additive alpha blend (Aa+B (1−a)). As indicated at 324, the image is tone mapped from its HDR linear encoding down to the dynamic range of the display. The tone mapping algorithm may include a form of highlight compression in order to reveal any highlight detail produced by either the camera or the rendering pipeline, up to the limitations of precision and the dynamic range of the display. As indicated at 330, the blended image is displayed.

The arrow returning from element 324 to elements 302 and 306 indicates that this method may be a continuous process that may continue as long as a user is using the MR system.

Figure 4A:
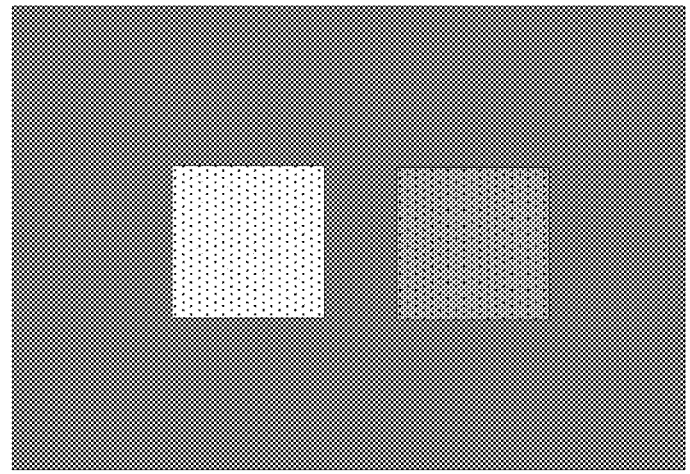
FIGS. 4A through 4E graphically illustrate generating exposure-compensated, foveated images for display in a MR system, according to some embodiments.

FIGS. 4A through 4E graphically illustrate generating exposure-compensated, foveated images for display in an MR system, according to some embodiments. FIG. 4A shows a simple scene that includes a dark gray background and two textured boxes, one white box and one gray box. If a person looks at the white box, they will not see texture detail on the gray box, but will know that the gray box is there. If they look at the gray they will see texture detail on the gray box, but will not see texture detail of the white box. This illustrates that the human visual system does not have the visual acuity to see detail outside of a foveated region determined by the point of gaze.

Figure 4B:
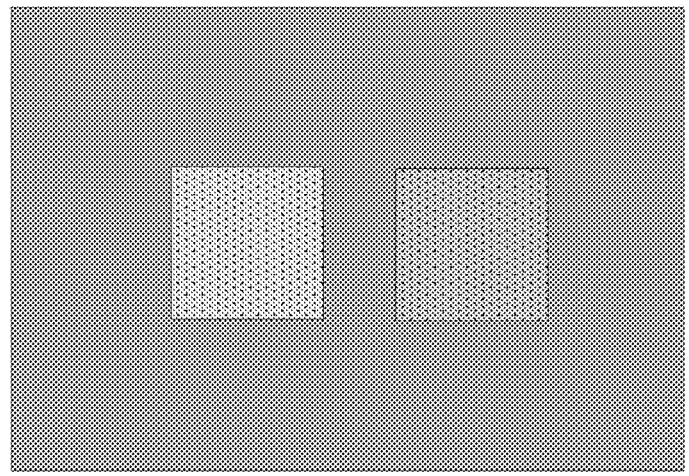

An image of the scene may be captured by a camera. FIG. 4B shows an image of the scene captured with default auto-exposure for the camera. This causes the white box and gray box to be exposed somewhere in between as the exposure is based on an average of the whole scene. If the light is intense, the viewer may not see texture detail on the white box because it gets clipped. Likewise, the viewer may not see texture detail on the gray box because it is in noise.

Figure 4C:
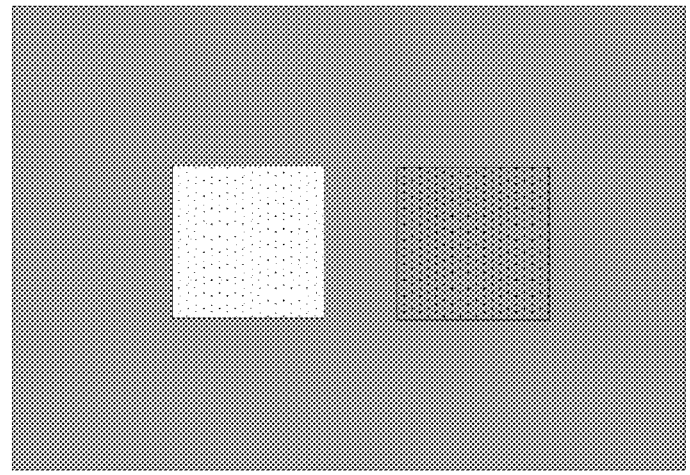
Figure 4D:
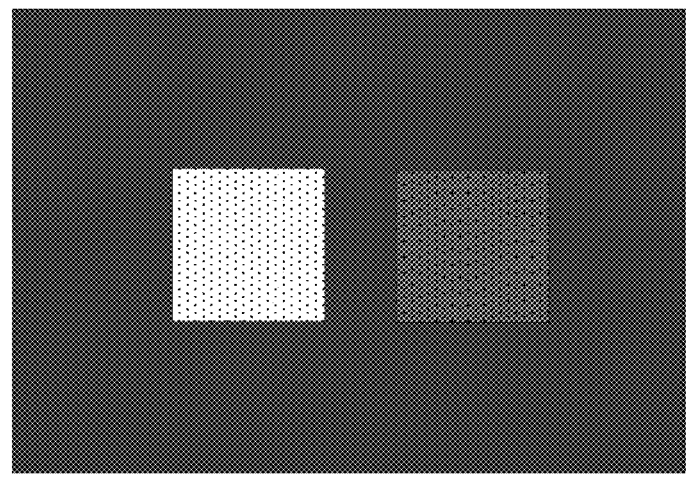

FIGS. 4C and 4D illustrate exposing the image based on gaze without scene exposure compensation. If exposing based on gaze, if the viewer looks at the gray box, they see texture detail in the gray box, as shown in FIG. 4C. If the viewer looks at the white box, they see texture detail in the white box, as shown in FIG. 4D. However, if the image is exposed based on gaze without scene exposure compensation, when the viewer looks at the gray box, the whole scene gets brighter as shown in FIG. 4C. When the user looks at the white box, the whole scene gets darker as shown in FIG. 4D.

Figure 4E:
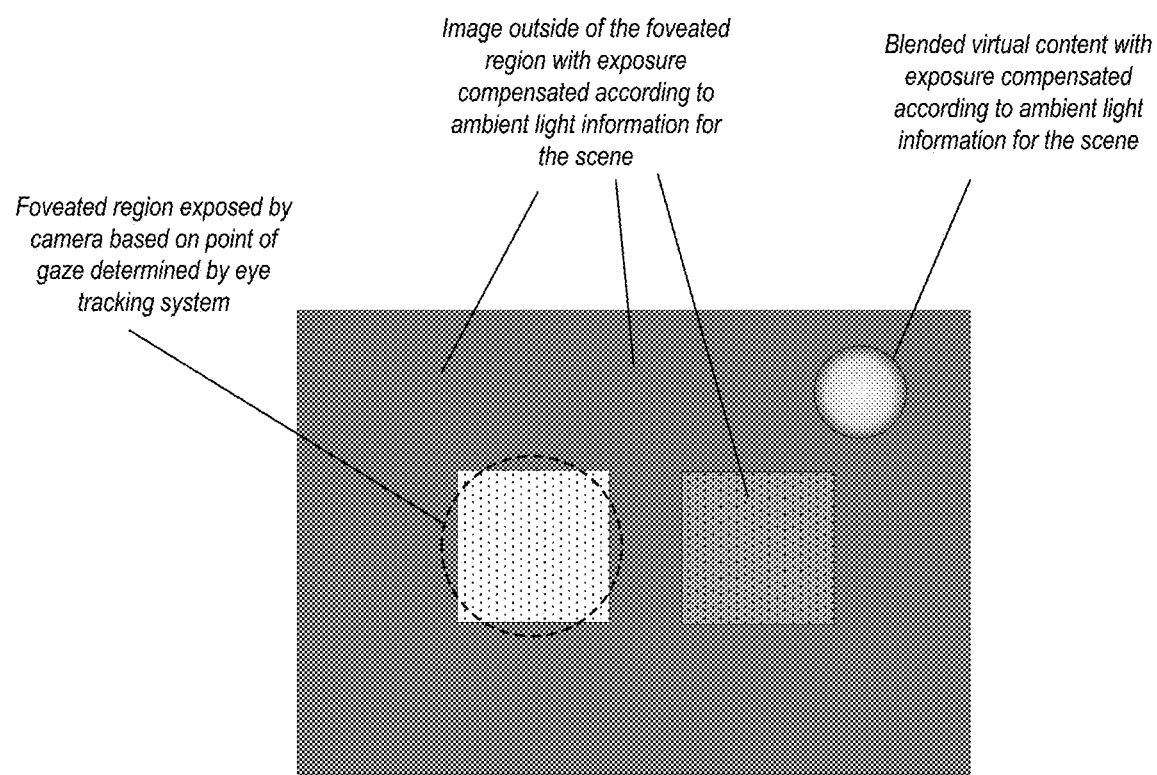

FIG. 4E illustrates an image captured using the gaze-based exposure methods described herein. Embodiments expose the image based on gaze so that the region of interest can be viewed in detail, but apply exposure compensation to the rest of the scene so that scene exposure remains constant. As the viewer glances between the two boxes, the camera is exposing for what the user is looking at, but the image that the viewer sees is exposure compensated based on ambient lighting of the scene. The dashed circle in FIG. 4E shows a foveated region exposed by the camera based on a point of gaze determined by an eye tracking system. The image outside of the foveated region is exposure compensated according to ambient light information for the scene. Blended virtual content may be included in the scene that is exposure compensated according to ambient light information for the scene.

FIG. 5 is a block diagram illustrating an example MR system that may include components and implements methods as illustrated in FIGS. 1 through 4E, according to some embodiments. In some embodiments, a MR system may include an HMD 2000 such as a headset, helmet, goggles, or glasses. HMD 2000 may implement any of various types of display technologies. For example, the HMD 2000 may include a display system that displays frames including left and right images on screens or displays 2022A and 2022B that are viewed by a user through eyepieces 2220A and 2220B. The display system may, for example, be a DLP (digital light processing), LCD (liquid crystal display), or LCoS (liquid crystal on silicon) technology display system. To create a three-dimensional (3D) effect in a 3D virtual view, objects at different depths or distances in the two images may be shifted left or right as a function of the triangulation of distance, with nearer objects shifted more than more distant objects. Note that other types of display systems may be used in some embodiments.

In some embodiments, HMD 2000 may include a controller 2030 configured to implement functionality of the MR system and to generate frames (each frame including a left and right image) that are provided to displays 2022A and 2022B. In some embodiments, HMD 2000 may also include a memory 2032 configured to store software (code 2034) of the MR system that is executable by the controller 2030, as well as data 2038 that may be used by the MR system when executing on the controller 2030. In some embodiments, HMD 2000 may also include one or more interfaces (e.g., a Bluetooth technology interface, USB interface, etc.) configured to communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multi-processor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more sensors 2050 that collect information about the user's environment (video, depth information, lighting information, etc.). The sensors 2050 may provide the information to the controller 2030 of the MR system. In some embodiments, sensors 2050 may include, but are not limited to, visible light cameras (e.g., video cameras) and ambient light sensors.

HMD 2000 may be positioned on the user's head such that the displays 2022A and 2022B and eyepieces 2220A and 2220B are disposed in front of the user's eyes 2292A and 2292B, for example as illustrated in FIG. 1. IR light sources 2230A and 2230B (e.g., IR LEDs) may be positioned in the HMD 2000 (e.g., around the eyepieces 2220A and 2220B, or elsewhere in the HMD 2000) to illuminate the user's eyes 2292A and 2292B with IR light. Eye tracking cameras 2240A and 2240B (e.g., IR cameras, for example 400×400 pixel count cameras or 600×600 pixel count cameras that operate at 850 nm or 940 nm, or at some other IR wavelength, and that capture frames at a rate of 60-120 frames per second (FPS)) are located at each side of the user's face. In various embodiments, the eye tracking cameras 2240 may be positioned in the HMD 2000 to provide a direct view of the eyes 2292, a view of the eyes 2292 through the eyepieces 2220, or a view of the eyes 2292 via reflection off hot mirrors or other reflective components. Note that the location and angle of eye tracking cameras 2240A and 2240B is given by way of example, and is not intended to be limiting. In some embodiments, there may be a single eye tracking camera 2240 located on each side of the user's face. In some embodiments there may be two or more eye tracking cameras 2240 on each side of the user's face. For example, in some embodiments, a wide-angle camera 2240 and a narrower-angle camera 2240 may be used on each side of the user's face. A portion of IR light emitted by light sources 2230A and 2230B reflects off the user's eyes 2292A and 2292B is received at respective eye tracking cameras 2240A and 2240B, and is captured by the eye tracking cameras 2240A and 2240B to image the user's eyes 2292A and 2292B. Eye tracking information captured by the cameras 2240A and 2240B may be provided to the controller 2030. The controller 2030 may analyze the eye tracking information (e.g., images of the user's eyes 2292A and 2292B) to determine eye position and movement and/or other features of the eyes 2292A and 2292B. In some embodiments, to accurately determine the location of the user's eyes 2292A and 2292B with respect to the eye tracking cameras 2240A and 2240B, the controller 2030 may perform a 3D reconstruction using images captured by the eye tracking cameras 2240A and 2240B to generate 3D models of the user's eyes 2292A and 2292B. The 3D models of the eyes 2292A and 2292B indicate the 3D position of the eyes 2292A and 2292B with respect to the eye tracking cameras 2240A and 2240, which allows the eye tracking algorithms executed by the controller to accurately track eye movement.

The eye tracking information obtained and analyzed by the controller 2030 may be used by the controller in performing various VR or AR system functions. For example, the point of gaze on the displays 2022A and 2022B may be estimated from images captured by the eye tracking cameras 2240A and 2240B; the estimated point of gaze may be used to cause the scene camera(s) of the HMD 2000 to expose images of a scene based on a region of interest (ROI) corresponding to the point of gaze. As described herein with reference to FIGS. 2 through 4E, the eye tracking information may then be used by controller 2030 in combination with ambient lighting information for the scene (e.g., collected by one or more ambient light sensors) to generate exposure-compensated, foveated images for display. As another example, the estimated point of gaze may enable gaze-based interaction with virtual content shown on the displays 2022A and 2022B. As another example, in some embodiments, brightness of the displayed images may be modulated based on the user's pupil dilation as determined by the eye tracking system.

In some embodiments, the HMD 2000 may be configured to render and display frames to provide an augmented or mixed reality (MR) view for the user based at least in part according to sensor 2050 inputs. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by MR system and composited with the displayed view of the user's real environment.

Embodiments of the HMD 2000 as illustrated in FIG. 5 may also be used in virtual reality (VR) applications to provide VR views to the user. In these embodiments, the controller 2030 of the HMD 2000 may render or obtain virtual reality (VR) frames that include virtual content, and the rendered frames may be displayed to provide a virtual reality (as opposed to mixed reality) experience to the user. In these systems, rendering of the VR frames may be affected based on the point of gaze determined from the eye tracking system.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated device 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from device 2000 may be transmitted to device 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon one or more computer-readable media. Generally speaking, computer-readable media may include non-transitory, computer-readable storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a head-mounted device (HMD) comprising:
 a camera configured to capture images of a scene;
 a gaze tracking system; and
 an ambient light sensor;
a controller comprising one or more processors configured to:
 determine a region of interest in the scene based on gaze tracking information obtained from the gaze tracking system;

cause the camera to capture an image of the scene selectively auto-exposed at a camera exposure selected according to the region of interest within the scene of the camera;

determine an exposure compensation based on a difference between the camera exposure determined according to the region of interest within the scene and a scene exposure determined from ambient lighting information for the scene obtained from the ambient light sensor; and apply the exposure compensation determined based on the difference to only an area of the image outside of the region of interest to generate an exposure-compensated image in which the region of interest is exposed at the camera exposure and the area outside of the region of interest is exposed at the scene exposure.

2. The system as recited in claim 1, wherein the exposure compensation is determined by subtracting the camera exposure from the scene exposure.

3. The system as recited in claim 1, wherein the controller is further configured to apply a tone-mapping technique to the exposure-compensated image to tone-map the image from HDR linear encoding to a dynamic range of a display screen.

4. The system as recited in claim 3, wherein the tone mapping technique includes highlight compression to reveal detail of highlights in the exposure-compensated image.

5. The system as recited in claim 1, wherein the controller is further configured to:

render an image containing virtual content, wherein, to render the image containing virtual content, the controller is configured to apply the exposure compensation to the virtual content so that the image containing virtual content is exposed at the scene exposure;

blend the image containing virtual content into the exposure-compensated image to generate a blended image; and apply a tone-mapping technique to the blended image to tone-map the blended image from HDR linear encoding to a dynamic range of a display screen; and cause the blended image to be displayed on the display screen.

6. The system as recited in claim 1, wherein the HMD further comprises at least one display screen configured to display frames containing virtual content blended into the exposure-compensated image for viewing by a user.

7. The system as recited in claim 6, wherein the HMD further comprises left and right optical lenses located between the at least one display screen and the user's eyes.

8. The system as recited in claim 1, wherein the eye tracking system comprises:

at least one eye tracking camera; and one or more light sources configured to emit light towards the user's eyes, wherein the at least one eye tracking camera captures a portion of the light reflected off the user's eyes.

9. The system as recited in claim 1, wherein the controller is a component of the HMD.

10. A method, comprising:

performing, by one or more processors:

determining a region of interest in a scene based on gaze tracking information;

causing a camera to capture an image of the scene auto-exposed at a camera exposure determined according to the region of interest within the scene of the camera; and applying exposure compensation to only an area of the image outside the region of interest only to generate an exposure-compensated image in which the region of interest is exposed at the camera exposure and the area outside of the region of interest is exposed at a scene exposure, wherein the applied exposure compensation is determined based on a difference between the camera exposure determined according to the region of interest and the scene exposure.

11. The method as recited in claim 10, further comprising determining the scene exposure from ambient lighting information for the scene.

12. The method as recited in claim 10, further comprising determining the exposure compensation by subtracting the camera exposure from the scene exposure.

13. The method as recited in claim 10, further comprising applying tone-mapping to the exposure-compensated image to tone-map the image from HDR linear encoding to a dynamic range of a display screen.

14. The method as recited in claim 13, wherein applying tone-mapping to the exposure-compensated image comprises applying highlight compression to reveal detail of highlights in the exposure-compensated image.

15. The method as recited in claim 10, further comprising:

rendering an image containing virtual content, wherein rendering the image containing virtual content comprises applying the exposure compensation to the virtual content so that the image containing virtual content is exposed at the scene exposure;

blending the image containing virtual content into the exposure-compensated image to generate a blended image;

applying a tone-mapping technique to the blended image to tone-map the blended image from HDR linear encoding to a dynamic range of a display screen; and causing the blended image to be displayed on the display screen.

16. The method as recited in claim 15, wherein applying tone-mapping to the blended image comprises applying highlight compression to reveal detail of highlights in the exposure-compensated image and in the blended virtual content.

17. The method as recited in claim 10, wherein the one or more processors and the camera are components of a head-mounted device (HMD), wherein the HMD further comprises at least one display screen, the method further comprising causing frames containing virtual content blended into the exposure-compensated image to be displayed by the at least one display screen for viewing by a user.

18. The method as recited in claim 17, wherein the HMD further comprises left and right optical lenses located between the at least one display screen and the user's eyes.

19. The method as recited in claim 10, wherein the one or more processors and the camera are components of a head-mounted device (HMD), the method further comprising obtaining the gaze tracking information from an eye tracking system of the HMD.

20. One or more non-transitory computer-readable storage media storing program instructions that when executed on or across one or more processors cause the one or more processors to:

determine a region of interest in a scene based on gaze tracking information obtained from a gaze tracking system;

cause a camera to capture an image of the scene auto-exposed at a camera exposure determined according to the region of interest within the scene of the camera;

determine an exposure compensation based on a difference between the camera exposure determined according to the region of interest within the scene and a scene exposure determined from ambient lighting information for the scene obtained from an ambient light sensor; and apply the exposure compensation determined according to the region of interest within the scene to only an area of the image outside of the region of interest to generate an exposure-compensated image in which the region of interest is exposed at the camera exposure and the image area outside of the region of interest is exposed at the scene exposure.

\* \* \* \* \*